(12) United States Patent
Meilleur

(10) Patent No.: US 6,763,589 B2
(45) Date of Patent: Jul. 20, 2004

(54) PROCESS FOR THE MANUFACTURE OF INSULATING FORMWORK PANELS

(76) Inventor: Serge Meilleur, 348 d'Iberville, Varennes, Quebec (CA), J3X 1T9

(*) Notice: Subject to any disclaimer, the term of this patent is extended or adjusted under 35 U.S.C. 154(b) by 31 days.

(21) Appl. No.: 10/059,303

(22) Filed: Jan. 31, 2002

(65) Prior Publication Data

US 2002/0069532 A1 Jun. 13, 2002

Related U.S. Application Data

(62) Division of application No. 09/661,083, filed on Sep. 13, 2000, now abandoned.

(51) Int. Cl.[7] .............................. B21D 47/00; E04C 1/00
(52) U.S. Cl. ................................ 29/897.32; 29/897.34; 29/458; 29/779; 29/820; 52/309.7; 52/649.1
(58) Field of Search ............................ 29/897.3, 897.32, 29/897.34, 897.1, 417, 430, 458, 469, 527.3, 779, 782, 819, 820, 791, 783; 52/309.7, 309.9, 649.1; 264/45.8, 46.2, 46.7; 428/309.9

(56) References Cited

U.S. PATENT DOCUMENTS

| | | | | |
|---|---|---|---|---|
| 3,246,058 A | * | 4/1966 | Voelker | ...................... 264/46.2 |
| 3,542,636 A | * | 11/1970 | Wandel | ...................... 52/795.1 |
| 3,555,131 A | * | 1/1971 | Weismann | .................. 264/46.7 |
| 3,900,625 A | * | 8/1975 | Chen | ......................... 428/110 |
| 4,090,336 A | * | 5/1978 | Carroll | ....................... 52/309.7 |
| 4,104,842 A | * | 8/1978 | Rockstead et al. | ......... 52/649.1 |
| 4,351,870 A | * | 9/1982 | English | ....................... 428/174 |
| 4,358,498 A | * | 11/1982 | Chavannes | .................. 428/108 |
| 4,516,372 A | * | 5/1985 | Grutsch | ...................... 52/309.7 |
| 4,611,450 A | * | 9/1986 | Chen | ......................... 52/309.4 |
| 4,614,013 A | * | 9/1986 | Stevenson | ................ 29/897.34 |
| 4,856,248 A | * | 8/1989 | Larson et al. | .................. 52/405 |
| 4,861,642 A | * | 8/1989 | Stagg et al. | ................. 428/139 |
| 4,888,931 A | | 12/1989 | Meilleur | ....................... 52/426 |
| 5,128,196 A | * | 7/1992 | Luetkens et al. | ........... 428/213 |
| 5,162,143 A | * | 11/1992 | Porter et al. | ................. 428/179 |
| 5,366,787 A | * | 11/1994 | Yasui et al. | .................. 428/174 |
| 5,404,687 A | * | 4/1995 | Blake et al. | .................. 52/600 |
| 5,543,204 A | * | 8/1996 | Ray | ........................... 428/179 |
| 5,551,204 A | * | 9/1996 | Mayrand | .................... 52/795.1 |
| 5,617,690 A | * | 4/1997 | Gibbs | ........................... 52/518 |
| 5,792,552 A | * | 8/1998 | Langkamp et al. | ....... 428/309.9 |
| 6,000,194 A | * | 12/1999 | Nakamura | ............... 52/783.17 |
| 6,167,671 B1 | * | 1/2001 | Wilson | ....................... 52/654.1 |
| 6,205,728 B1 | * | 3/2001 | Sutelan | ...................... 52/309.7 |
| 6,272,805 B1 | * | 8/2001 | Ritter et al. | ............. 52/309.11 |
| 6,412,243 B1 | * | 7/2002 | Sutelan | ...................... 52/309.7 |

FOREIGN PATENT DOCUMENTS

CA        985 866     *    3/1976

* cited by examiner

*Primary Examiner*—I. Cuda Rosenbaum
*Assistant Examiner*—Marc Jimenez
(74) *Attorney, Agent, or Firm*—Robic

(57) ABSTRACT

Disclosed is a process for the industrial manufacture of a formwork panel in a continuous manner. In this process, a corrugated reinforcing metal core is manufactured in the form of a continuous metal core band. The metal core band is supplied onto a main conveyor. Simultaneously, a mixture of components that react with each other to make an insulating foam, is prepared and continuously injected at the inlet of the main conveyor. The foam that is being formed and expands along the main conveyor, is compressed so as to form to a continuous main body band having a given height and given thickness. This continuous main body band incorporating the continuous metal core band. Last of all, the continuous main body band and the continuous metal core band incorporated therein are cut at the outlet of the main conveyor to obtain the requested panels.

6 Claims, 6 Drawing Sheets

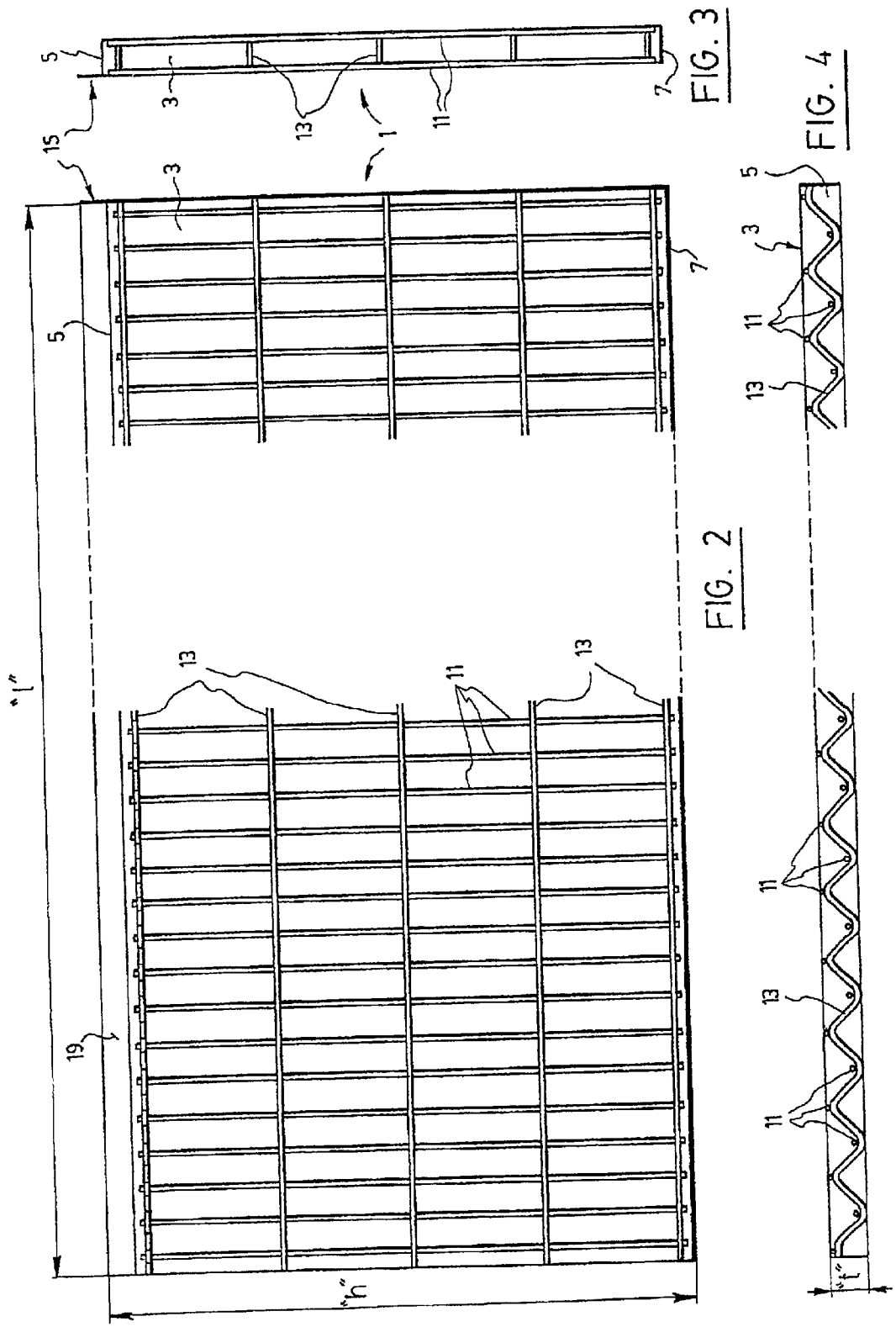

PROCESS FOR THE MANUFACTURE OF INSULATING FORMWORK PANELS

CROSS-REFERENCE

This application is a divison of application Ser. No. 09/661,083 filed on Sep. 13, 2000 now abandoned.

BACKGROUND OF THE INVENTION

1) Field of the Invention

The present invention relates to insulated formwork panels and to a process for their manufacture.

More particularly, the invention relates to prefabricated formwork panels that are made of an insulating material and are reinforced with a strong metal core. Such panels can be used in combination with other identical panels to form a mold into which concrete can be casted. After casting of the concrete, the panels are left in place, thereby providing a concrete wall with insulating panels on both of its sides.

2) Description of the Prior Art

U.S. Pat. No. 4,888,931 in the name of the present inventor discloses an insulating formwork for use to manufacture a concrete wall. This formwork is made of foam panels that are preferably made of expanded polystyrene and are connected to each other in parallel relationship by means of tie-rods engaged into angle-irons fitted into slits provided into the upper and lower edges of each panel. Once assembled, the panels define a concrete formwork into which concrete can be poured.

U.S. Pat. No. 4,604,843 in the name of ETABLISSE-MENTS PATURLE discloses a formwork for use to manufacture a concrete wall. This formwork is made of insulating foam panels reinforced by a core consisting essentially of a mesh bonded to an array of parallel tubes. As an alternative to the mesh, reference is also made to other reinforcing material such as a "perforated or imperforated foil" or "a grid of wires, rods of filaments . . . , a synthetic resin fabric or metallic or non-metallic filaments" (see column 4, lines 36 to 49). The panels are connected to each other in parallel relationship by means of horizontal elements having a ladder like configuration. This patent also discloses that the panels are preferably made of << a high density synthetic resin such as expanded polystyrene, extruded polystyrene foam, polyurethane foam or a foamed phenolformaldehyde or like resin.

U.S. Pat. No. 4,516,372 in the name of George A. GRUTSCHE discloses a concrete formwork made of modules comprising two parallel spaced apart panels preferably made of insulating foam. Each module also comprises small backing plates extending on the external surfaces of the eternal upper and lower edges of the panels. These plates are connected to each other by means of tie-rods extending through the panels. This patent discloses that the panels are preferably made of a low density plastic foam such as polyurethane that can be injected or poured into forms. This patent does not disclose or suggest that reinforcing cores or grids be incorporated into the panels.

Except for U.S. Pat. No. 4,516,372 which discloses that the panels are preferably manufactured by injection or pouring of the foam into molds at the job site, none of these patents discloses how the panels are manufactured. A fortiori, none of these three patents discloses or suggests how panels incorporating a reinforcing metal core may actually be manufactured industrially in a continuous manner.

SUMMARY OF THE INVENTION

A first object of the present invention is to provide an insulated formwork panel that incorporates a corrugated reinforcing metal core and can easily and efficiently be manufactured in a continuous manner. Thanks to its reinforcing metal core that is corrugated, the panel is very strong and resistant to pressure whatever be the direction in which such pressure is exerted. Of course, since it is made of foam, the panel is also heat and/or cold insulating and moisture resistant. Therefore, it can efficiently be used to build up permanent self-supporting formworks into which concrete can be cast to form insulated walls.

In accordance with the invention, this first object is achieved with an insulated formwork panel having a main body made of insulating foam. This main body has a given length, a given height with opposite edges and a given thickness and incorporates a corrugated reinforcing metal core embedded into the foam. The corrugated metal core is of substantially the same height as the main body and extending within the same over all the length thereof.

Preferably, the metal core consists of a grid comprising a first set of spaced apart straight rods extending along the height of the main body and a second set of spaced-apart rods extending along the length of the main body. The rods of the second set are connected to the rods of the first set and are corrugated to form V-shaped zigzags of such a depth that the core is of an average thickness close to the thickness of the main body in order to fill up the same.

More preferably, the formwork panel further comprises a T-shaped bar positioned onto one of the opposite edges of the main body to facilitate connection of tie-rods. The bar has a top portion with two opposite sides and a leg portion. One side of the top portion and the leg portion extend flat onto one side of the main body and onto one of its opposite edges, respectively, over all the length of the main body.

Thanks to the very specific structure and size of its metal core, the panel according to the invention is very strong and resistant, thereby making it useful to build up permanent, self-supporting formworks.

Another object of the present invention is to provide a process for the industrial manufacture of insulated formwork panels of the above described type.

The process according to the invention comprises the basic steps of:

manufacturing the metal cores of the formwork panels in the form of a continuous metal core band;

supplying the metal core band onto a main conveyor having an inlet in which the metal core band is continuously fed, and an outlet;

preparing a mixture of components that react with each other to make the insulating foam;

continuously injecting the mixture at the inlet of the main conveyor;

compressing the foam that is being formed and expands along the main conveyor so as to form a continuous main body band having a given height and given thickness, the continuous main body band incorporating the continuous metal core band; and cutting at a given length the continuous main body band and the continuous metal core band incorporated therein at the outlet of the main conveyor to obtain the requested panels.

Preferably, the compressing step is carried out by a secondary conveyor extending on top of the main conveyor. In such a case, the process comprises the additional steps of:

positioning a bottom layer of supporting material onto the main conveyor upstream of the inlet thereof so that the metal core band and the mixture of compounds be respectively supplied and injected on top of the bottom layer, the bottom layer being continuous and having side edges;

positioning a top layer of supporting material onto the secondary conveyor so as to cover the metal core band and foam that is being formed, the top layer being continuous and having side edges; and folding and positioning the side edges of the bottom and top layers so as to control expansion of the foam and height and thickness adjustment of the continuous main body band.

More preferably, the process may also comprise the additional steps of:

supplying a continuous T-shaped bar into the inlet of the main conveyor, said bar having a top portion with two opposite sides and a leg portion and being supplied in such a manner that one side of its top portion and its leg portion extend flat onto one side and one of the opposite edges of the continuous main body band and, respectively, and cutting the continuous T-shaped bar together with the continuous main body band and the continuous metal core band incorporated therein at the outlet of the main conveyor.

The present invention and its numerous advantages will be better understood upon reading the following, non-restrictive description of a preferred embodiment thereof, made with reference to the appended drawings.

BRIEF DESCRIPTION OF THE DRAWINGS

FIG. 2 is a front elevational view of the panel according to the preferred embodiment of the invention, showing only the external contour of the main body thereof;

FIG. 3 is a side elevational view of the panel shown in FIG. 2;

FIG. 4 is a bottom plan view of the panel shown in FIG. 2;

DESCRIPTION OF A PREFERRED EMBODIMENT OF THE INVENTION

Figure 1:
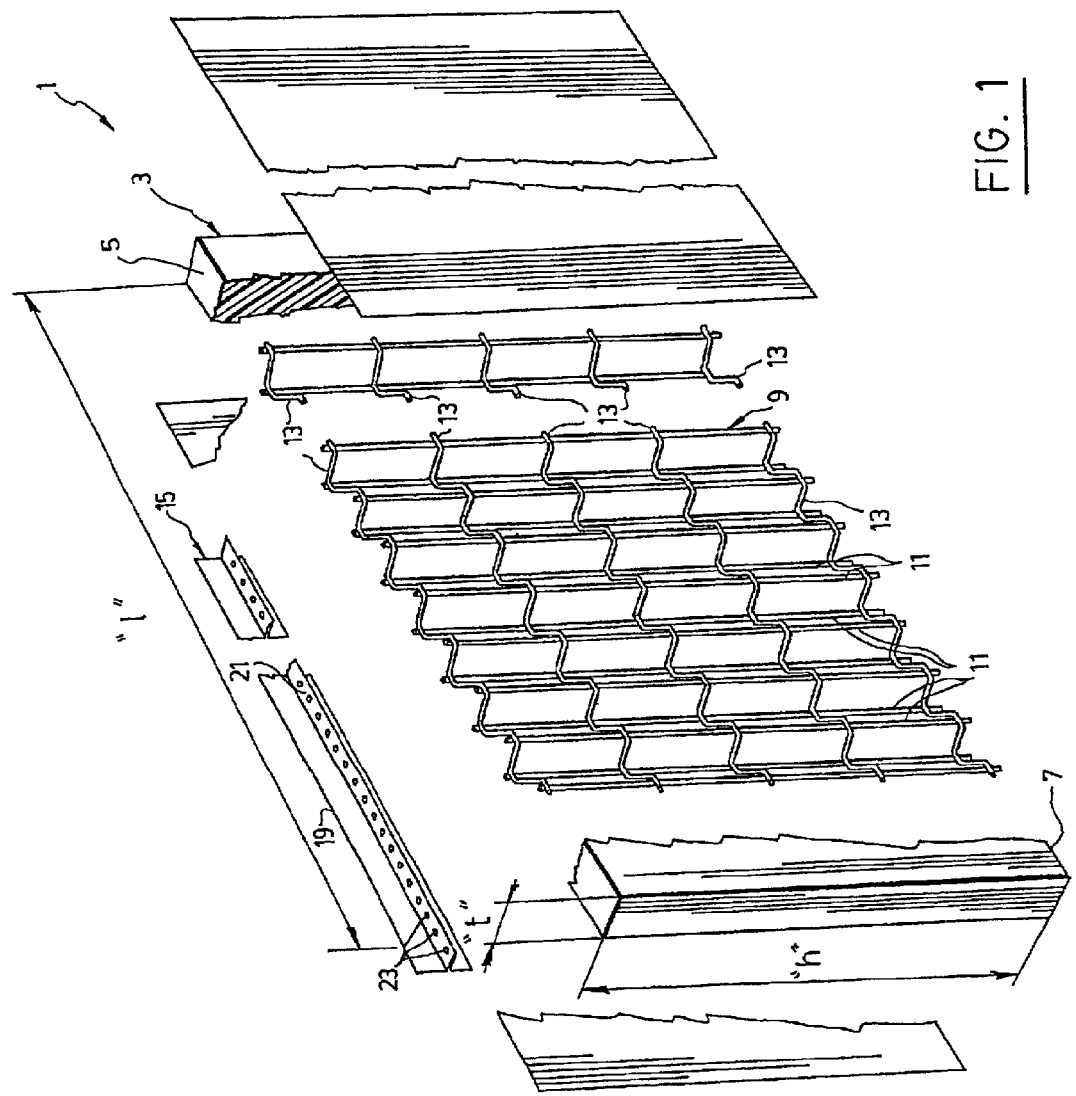
FIG. 1 is an exploded perspective view of a formwork panel according to a preferred embodiment of the invention.
Figure 5:
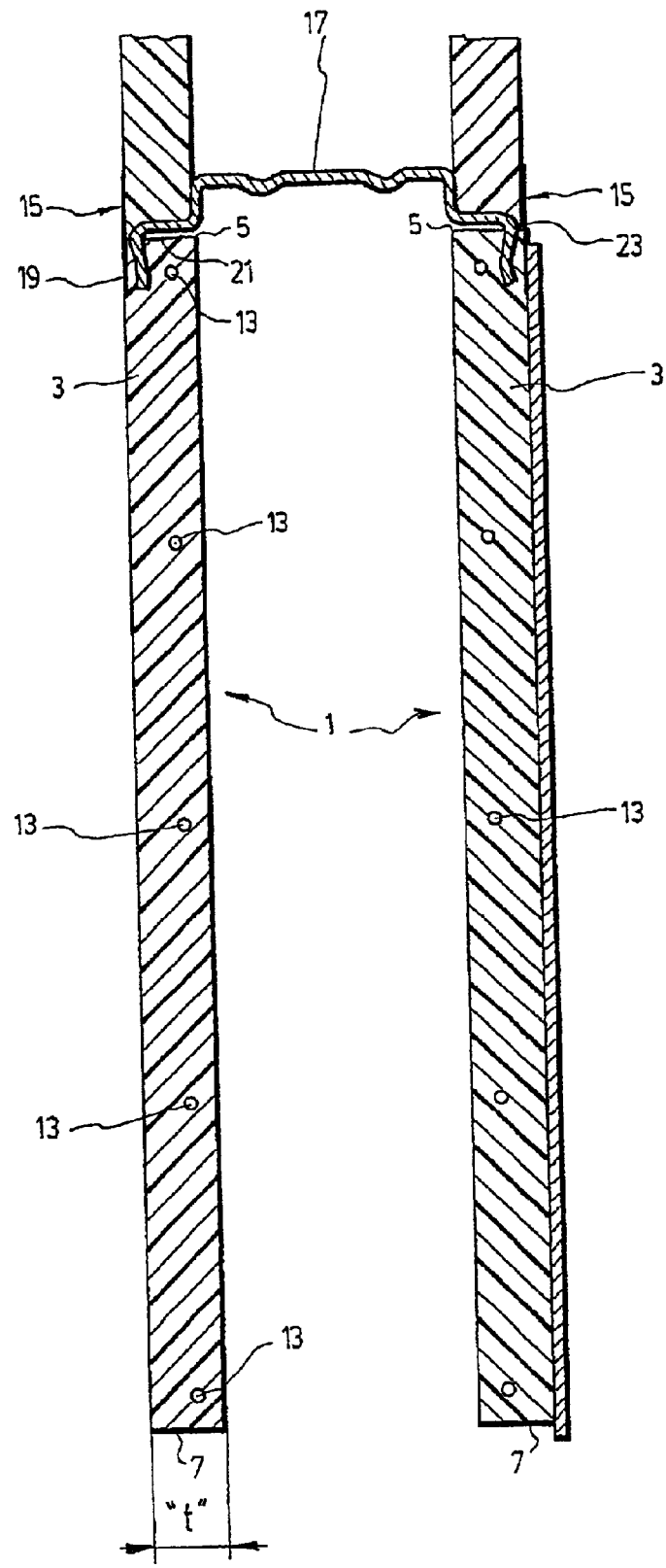
FIG. 5 is a side elevational view of a concrete formwork formed of panels according to the preferred embodiment of the invention.

The insulated formwork panel 1 according to the preferred embodiment of the invention shown in FIGS. 1 to 5 has a main body 3 made of an insulating foam which is preferably a polyurethane or polyisocyanurate foam whose basic components can be mixed up and injected at the inlet of a main conveyor in order to react with each other and form the requested foam that expands and is shaped while moving along with the main conveyor. The basic components and optional additives to be used and the reaction conditions that must be followed, are well known in the art and need not be further described (see, by way of non-restrictive example, BRIDGETONE CO. which discloses that, in the case of polyurethane, the basic components to be used are isocyanate and polyol and the additive is a foaming agent such as water).

The main body 3 of the panel 1 is preferably in the form of a rectangular parallelepiped with opposite flat sides. This main body 3 has a given length "I", a given height "h" with opposite edges 5, 7 and a given thickness "t". In a particularly preferred embodiment of the invention, "h" is equal to 2 feet, "t" is ranging from 1.25 to 3 inches "l" can be of any length. However, it must be understood that the length, height and thickness of the panel could easily be changed and adapted to the consumer's need, whenever required.

In accordance with a very important aspect of the invention, the panel 1 incorporates a corrugated reinforcing metal core 9 within its main body 3. The core 9 is embedded into the foam and used to give strength and mechanical resistance to the panel 1. It is of substantially the same height as the main body 3 and extends within the same over all its length. The fact that the metal core is corrugated and extends over the full length and height of the main body of the panel is an essential feature of the invention. Indeed, such is actually essential to give to the panel all the requested strength and mechanical resistance whatever be the direction in which a pressure is exerted.

Preferably, as is shown in the drawings, the metal core 9 consists of a grid comprising a first set of spaced apart straight rods 11 extending along the height of the panel and a second set of spaced-apart rods 13 extending along the length of the panel. The rods 13 of the second set are connected to the rods 11 of the first set and are corrugated to form V-shaped zigzags of such a depth that the core is of an average thickness close to the thickness "t" of the main body 3 in order to fill up the same.

Of course, the metal core 9 could be of a different structure without departing from the scope of the invention, provided of course that it is corrugated and extends over the full length and height of the panel 1. By way of example, use could be made of a perforated metal plate or of a rigid wire folded to form zigzags Preferably, the panel 1 may further comprise a T-shaped bar 15 positioned onto one of its opposite edges, viz the one numbered 5. The purpose of this bar is to facilitate connection of tie-rods 17 (see FIG. 5). The bar 15 has a top portion 19 with two opposite sides and a leg portion 21. One side of the top portion 19 and the leg portion 21 extends flat one of the flat side of the main body and onto the edge 5, respectively, over all the length thereof. The leg portion 21 of the bar is advantageously provided with regularly spaced apart perforations 23 to allow insertion of the ends of tie rods.

The way the panels 1 can be used to build up formworks is well known and needs not be described. In this connection, reference can be made inter alia to the three U.S. patents mentioned in the Background of the Invention hereinabove.

As indicated in the Summary of the Invention hereinabove, another object of the invention lies in the process that can be used for manufacturing the insulated formwork panels 1 disclosed hereinabove in a continuous and industrial manner.

Figure 6:
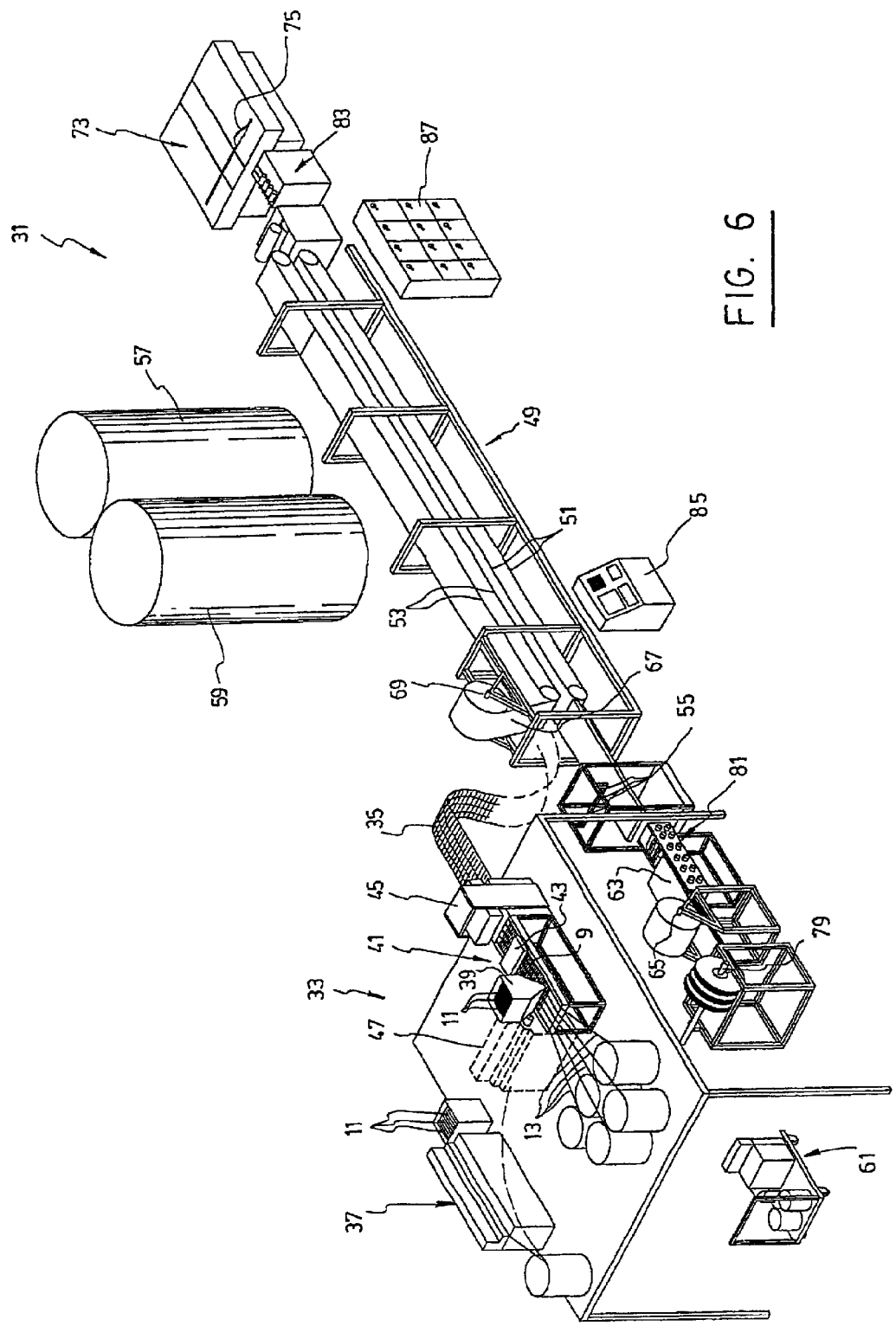
FIG. 6 is a perspective view of a machine for the continuous manufacture of formwork panels like the one shown in FIGS. 1 to 5.
Figure 7:
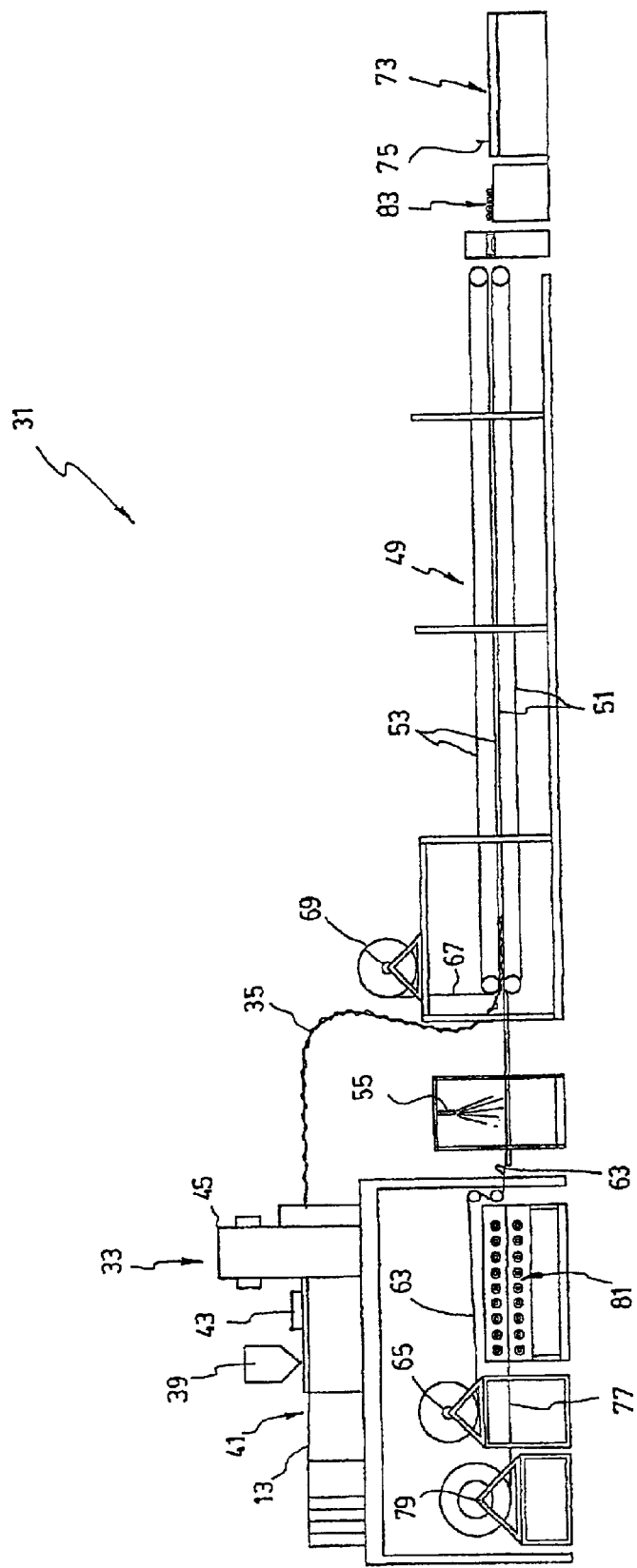
FIG. 7 is a side elevational view of the machine shown in FIG. 8.

FIGS. 6 and 7 are illustrative of an industrial machine 31 that can be used to carry out this process.

The machine 31 comprises a core manufacturing unit 33 in which the metal cores 9 of the formwork panels are manufactured in the form of a continuous metal core band 35. The core manufacturing unit 33 comprises a first working table 37 on which the straight rods 11 of the grids forming the cores 9 are cut at a requested length which corresponds to the height "h" of the panel. The rods 11 are then transferred into a hopper 39 located on top of a second working table 41. The hopper 39 is used to position the straight rods 11 in spaced apart relationship transversally on top of a conveyor that is part of the second working table. Continuous wires forming the second set of rods 13 of the metal cores 9 are then positioned onto the straight rods 11. These rods 13 are spaced apart and extend along the axis of the second working table, that is in a direction perpendicular to the straight rods 11. A welding unit 43 is provided on top of the conveyor downstream the hopper 39 to connect the continuous rods 13 to the straight rods 11. Finally a press 45 is provided downstream the welding unit 43 for corrugating the continuous rods 13 to form V-shaped zigzags of such a depth that the resulting metal core band 35 is of an average thickness close to the thickness of the main bodies of the panels.

Each of the elements of the core manufacturing unit 33 are well known in the art and commonly used in the grid and wire manufacturing industry. Accordingly, there is no need to further describe them. However, it is worth noting that the invention is not limited to this embodiment exclusively. Indeed, the grid forming the continuous metal core band 35 could be manufactured in numerous other ways. By way of example, the straight rods 11 could be cut and fed in a continuous manner onto the second working table by a supply equipment 47 (shown in doted line) instead of being cut on a first working table 37 separate from the second one 41. The grid forming the continuous metal core 35 could also be manufactured at places different from the place where is located the machine 31.

Once it has been manufactured, the continuous metal core band 35 is supplied from the unit 33 to the inlet of a panel manufacturing unit 49 comprising a main conveyor 51 onto which the core band 35 is laid down, and a secondary conveyor 53 extending on top of the main conveyor.

While the metal core band 35 moves through the inlet of the main conveyor 51, a mixture of components that react with each other to make the insulating foam forming the main bodies 3 of the panels 1, is prepared. This mixture is continuously injected via a set of nozzles 55 at the inlet of the main conveyor 51.

In practice, the components used to prepare the foam can be stored in separate tanks 57, 59 located within the plant where the machine 31 is installed, and mixed together by a set of pumps and mixer 61. Once again, this technique is well known in the art and needs not be further described in greater detail.

The foam that is being formed by reaction of the mixed components expands while it moves along the main conveyor 51 and it is compressed by the secondary conveyor 53 so as to form a continuous main body band having the height and thickness of the requested panels. Of course, this continuous main body band incorporates the continuous metal core band 35 which is simultaneously supplied in a continuous manner at the inlet of the panel manufacturing unit 49.

Figure 8:
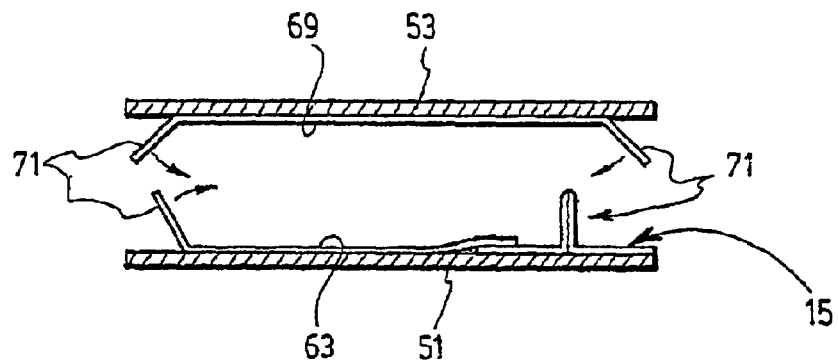
FIG. 8 is a front view of the inlet of the panel manufacturing unit of the machine shown in FIGS. 6 and 7, illustrating the way the top and bottom layers of supporting material can be positioned and folded to control expansion of the foam.
Figure 9A:
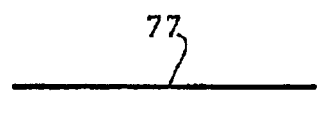
FIGS. 9a to 9d are end views of the metal plate used to manufacture the T-shaped bar, showing the sequence of folding steps that is carried out to obtain the requested bar.
Figure 9B:
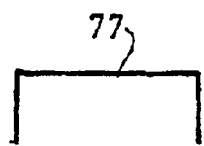
Figure 9C:
Figure 9D:
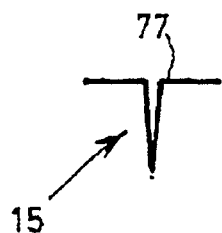

In order to better control the shaping of the continuous main body band in between the conveyors 51, 53, a bottom layer 63 of a supporting material preferably consisting of a sheet of paper or thin plastic material rolled up on a mandrel 65 is positioned onto the main conveyor 51 upstream of the inlet thereof so that the metal core band 35 and the mixture of compounds be respectively supplied and injected on top of this bottom layer. Simultaneously, a top layer 67 of the same supporting material rolled upon a mandrel 69 is positioned onto the secondary conveyor 53 so as to cover the metal core band and foam that is being formed. The top and bottom layers 63, 69 are wider than the conveyors 51, 53 and have opposite side edges 71 that can be folded and positioned onto each other as shown in FIG. 8 so as to form a "closed channel" so as to control expansion of the foam and thus to control the height and thickness of the continuous band.

At the outlet of the panel manufacturing unit 49, the continuous main body band and the continuous metal core band incorporated therein are cut onto a table 73 supporting a saw 75, that moves forwards at the same speed as the main conveyor 51 while it is operated. Such permits to obtain the requested panels 1.

In a preferred embodiment of the invention, a continuous T-shaped bar can be manufactured and supplied into the inlet of the main conveyor 51, so as to form the T-bars 15 of the panels 1 disclosed hereinabove. The continuous T-shaped bar can be formed prior to being supplied into the inlet of the main conveyor 51 by successive folding of a flat band of metal 77 (see FIGS. 9a to 9d) rolled upon a mandrel 79. Such a folding can be carried out in a press 81 provided for this purpose upstream of the inlet of the main conveyor 51. The continuous T-shaped bar must of course be supplied in such a manner that one side of its top portion and its leg portion extend flat onto one side and one of the opposite edges of the continuous main body band, respectively as is shown in FIGS. 1 to 5. The continuous T-shaped bar that is so formed is cut by the saw 75 together with the continuous main body and the continuous metal core band incorporated therein at the outlet of the main conveyor 51. Preferably, an auto feed drill unit 83 is provided upstream the table 73 to make regularly spaced apart perforations into the leg portion of the continuous T-shaped bar prior to cutting the same. As disclosed hereinabove, these perforations are intended to be used for fixing tie-rods.

As is shown, the components of the machine 31 are positioned relative to each other in such a manner as to make operation of the whole assembly as convenient as possible (see, for example, the positioning of the core manufacturing unit 33 above the mandrels 79 and 65). In use, the whole machine 31 can be controlled by a main control panel 85 and main electrically panel 87.

As may now be understood, the machine 31 is particularly efficient inasmuch as it permits to manufacture the panels 1 at high speed in a continuous manner.

Of course, numerous modifications could be made to the panel 1 and machine 31 that have been disclosed hereinabove without departing from the scope of the invention as defined in the appended claims.

What is claimed is:

1. A process for the industrial manufacture of insulated formwork panels, each of said panels having a main body made of insulating foam and having a given length, a given height with opposite edges and a given thickness, each of said main body incorporating a corrugated reinforcing metal core embedded into the foam, said metal core being of substantially the same height as said main body and extending within said main body over all the length thereof, said process comprising the steps of:

(a) manufacturing the metal cores of said formwork panels in the form of a continuous metal core band, said manufacturing step comprising:
  positioning straight rods in spaced apart relationship, said straight rods each having a height substantially equal to the height of main bodies of panels;
  positioning other rods onto the straight rods, said other rods being spaced apart and extending in a direction perpendicular to said straight rods;
  connecting said other rods to the straight rods; and
  corrugating said other rods to form V-shaped zigzags of such a depth that the resulting metal core band is of an average thickness close to the thickness of the main bodies of the panels,
(b) supplying said band onto a main conveyor having an inlet in which said band is continuously fed, and an outlet;
(c) preparing a mixture of components that react with each other to make the insulating foam;
(d) continuously injecting said mixture at the inlet of the main conveyor;
(e) compressing the foam that is being formed and expands along the main conveyor by means of a secondary conveyor extending on top of the first conveyor so as to form a continuous main body band having said given height and given thickness, said continuous main body band incorporating the continuous metal core band; and
(f) cutting at said given length the continuous main body band and the continuous metal core band incorporated therein at the outlet of the main conveyor to obtain said requested panels
wherein said process comprises the additional steps of:
  supplying a continuous T-shaped bar into the inlet of the main conveyor, said bar having a too portion with two opposite sides and a leg portion and being supplied in such a manner that one side of its top portion and its leg portion extend flat onto one side of the continuous main body band and onto one of the opposite edges of said continuous main body band, respectively;
  positioning a bottom layer of supporting material onto the main conveyor upstream of the inlet thereof so that the metal core band and the mixture of compounds be respectively supplied and injected on too of said bottom layer, said bottom layer being continuous and having side edges;
  positioning a too lever of supporting material onto the secondary conveyor so as to cover said metal core band and foam that is being formed, said top layer being continuous and having side edges;
  folding and positioning the side edges of said bottom and top layers so as to control expansion of the foam and height and thickness adjustment of said continuous main body ban; and
  cutting the continuous T-shaped bar together with the continuous main body and said continuous metal core band incorporated therein at the outlet of the main conveyor.

2. The process of claim 1, comprising the additional step of:
  making regularly spaced apart perforations into the leg portion of the continuous T-shaped bar.

3. The process of claim 2, comprising the additional step of:
  forming said continuous T-shaped bar prior to supplying it into the inlet of the main conveyor by successive folding of a flat band of metal.

4. The process of claim 3, wherein the mixture of compounds is selected to from a polyurethane or polyisocyanurate foam.

5. The process of claim 2, wherein the mixture of compounds is selected to form a polyurethane or polyisocyanurate foam.

6. The process of claim 1, wherein the mixture of compounds is selected to form a polyurethane or polyisocyanurate foam.

* * * * *